US012613223B2

(12) United States Patent
    Badeau

(10) Patent No.: US 12,613,223 B2
(45) Date of Patent: Apr. 28, 2026

(54) DRIFT TRACKING FOR ACOUSTIC SCAN

(71) Applicant: Evident Canada, Inc., Québec (CA)

(72) Inventor: Nicolas Badeau, Quebec (CA)

(73) Assignee: Evident Canada, Inc., Québec (CA)

( * ) Notice: Subject to any disclaimer, the term of this patent is extended or adjusted under 35 U.S.C. 154(b) by 297 days.

(21) Appl. No.: 18/254,635

(22) PCT Filed: Nov. 24, 2021

(86) PCT No.: PCT/CA2021/051669
    § 371 (c)(1),
    (2) Date: May 26, 2023

(87) PCT Pub. No.: WO2022/109727
    PCT Pub. Date: Jun. 2, 2022

(65) Prior Publication Data
    US 2024/0280541 A1      Aug. 22, 2024

Related U.S. Application Data

(60) Provisional application No. 63/119,376, filed on Nov. 30, 2020.

(51) Int. Cl.
    *G01N 29/06*      (2006.01)
    *G01N 29/26*      (2006.01)

(52) U.S. Cl.
    CPC ....... *G01N 29/0645* (2013.01); *G01N 29/262* (2013.01); *G01N 2291/106* (2013.01); *G01N 2291/267* (2013.01)

(58) Field of Classification Search
    CPC ............. G01N 29/0645; G01N 29/262; G01N 2291/106; G01N 2291/267; G01N 29/2437; G01N 29/28
    See application file for complete search history.

(56) References Cited

U.S. PATENT DOCUMENTS 9,759,692 B2     9/2017   St-laurent et al.
2003/0089171 A1*  5/2003   Kenefick ................ G01N 19/08
                                                    73/597

(Continued)

FOREIGN PATENT DOCUMENTS

CN        116829982      9/2023
WO    WO-2022109727 A1   6/2022

OTHER PUBLICATIONS

"International Application Serial No. PCT/CA2021/051669, International Search Report mailed Feb. 28, 2022", 3 pgs.

(Continued)

*Primary Examiner* — Xin Y Zhong
(74) *Attorney, Agent, or Firm* — K&L Gates LLP

(57)      ABSTRACT

In acoustic inspection, if a probe assembly fails to maintain a controlled lateral position relative to a structure such as a weld being inspected, as the probe assembly is translated along a scan axis, a nearby flaw could be missed or mistaken for an earlier-observed feature. Apparatus and techniques described herein can assist in tracking the lateral displacement of a probe assembly relative to a region of interest such as an edge or centerline of a weld. Such a technique can, for example, be used to gate the received ultrasonic data or to update a presentation to a user, such as for updating an overlay (e.g., a weld template) and ruler position in an S-scan or other image representation.

22 Claims, 8 Drawing Sheets

(56) References Cited

U.S. PATENT DOCUMENTS

| | | |
|---|---|---|
| 2008/0000299 A1 | 1/2008 | Georgeson |
| 2020/0278323 A1 | 9/2020 | Kwan et al. |
| 2021/0096246 A1* | 4/2021 | Bourgelas ........... G01S 15/8995 |

OTHER PUBLICATIONS

"International Application Serial No. PCT/CA2021/051669, Written Opinion mailed Feb. 28, 2022", 5 pgs.

"European Application Serial No. 21895997.1, Extended European Search Report mailed Sep. 2, 2024", 8 pgs.

"Canadian Application Serial No. 3,202,065, Office Action mailed Sep. 27, 2024", 4 pgs.

"Canadian Application Serial No. 3,202,065, Response filed Jan. 23, 2025 to Office Action mailed Sep. 27, 2024", 14 pgs.

"European Application Serial No. 21895997.1, Response filed Mar. 17, 2025 to Extended European Search Report mailed Sep. 2, 2024", w claims, 10 pgs.

* cited by examiner

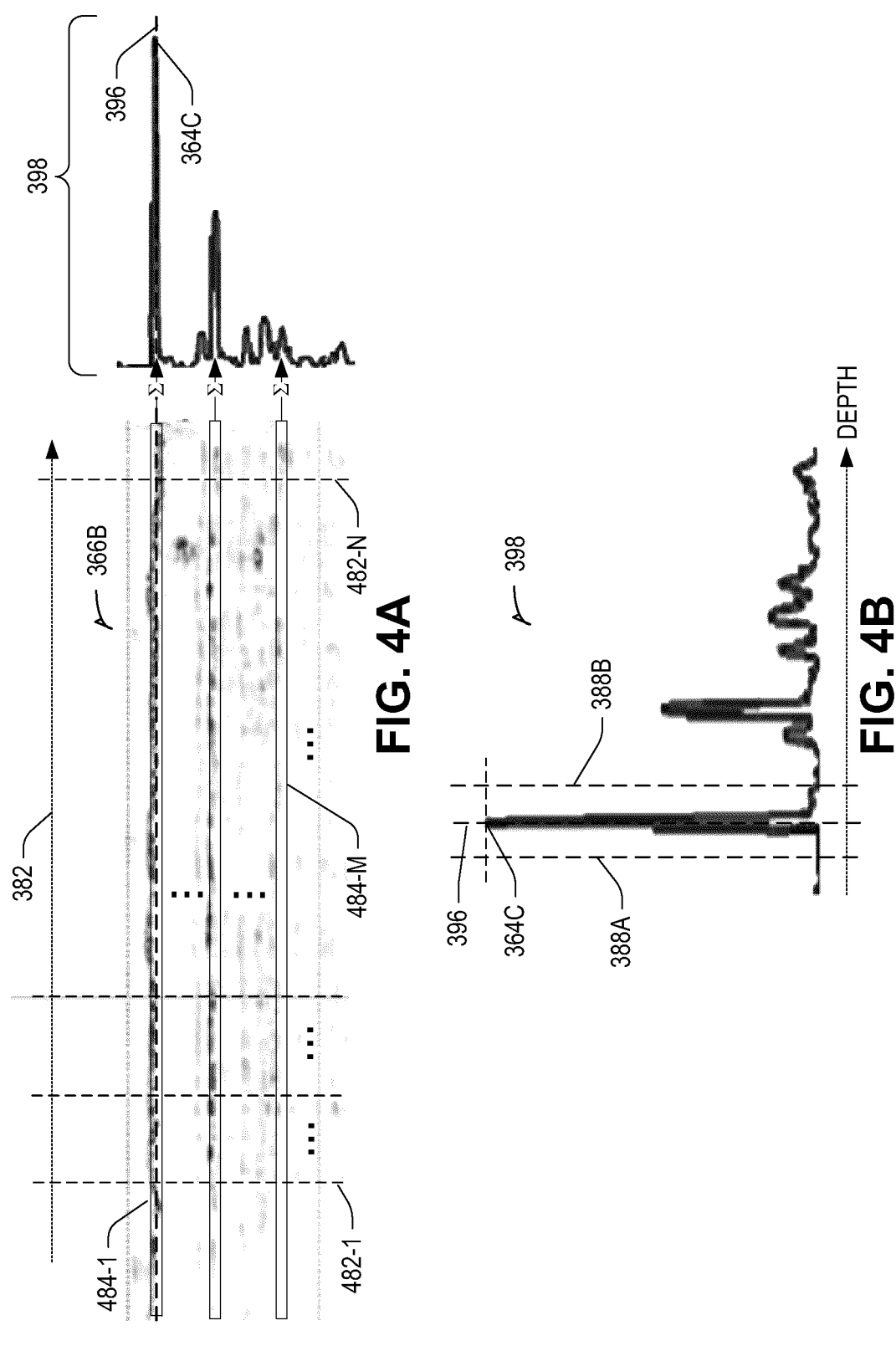

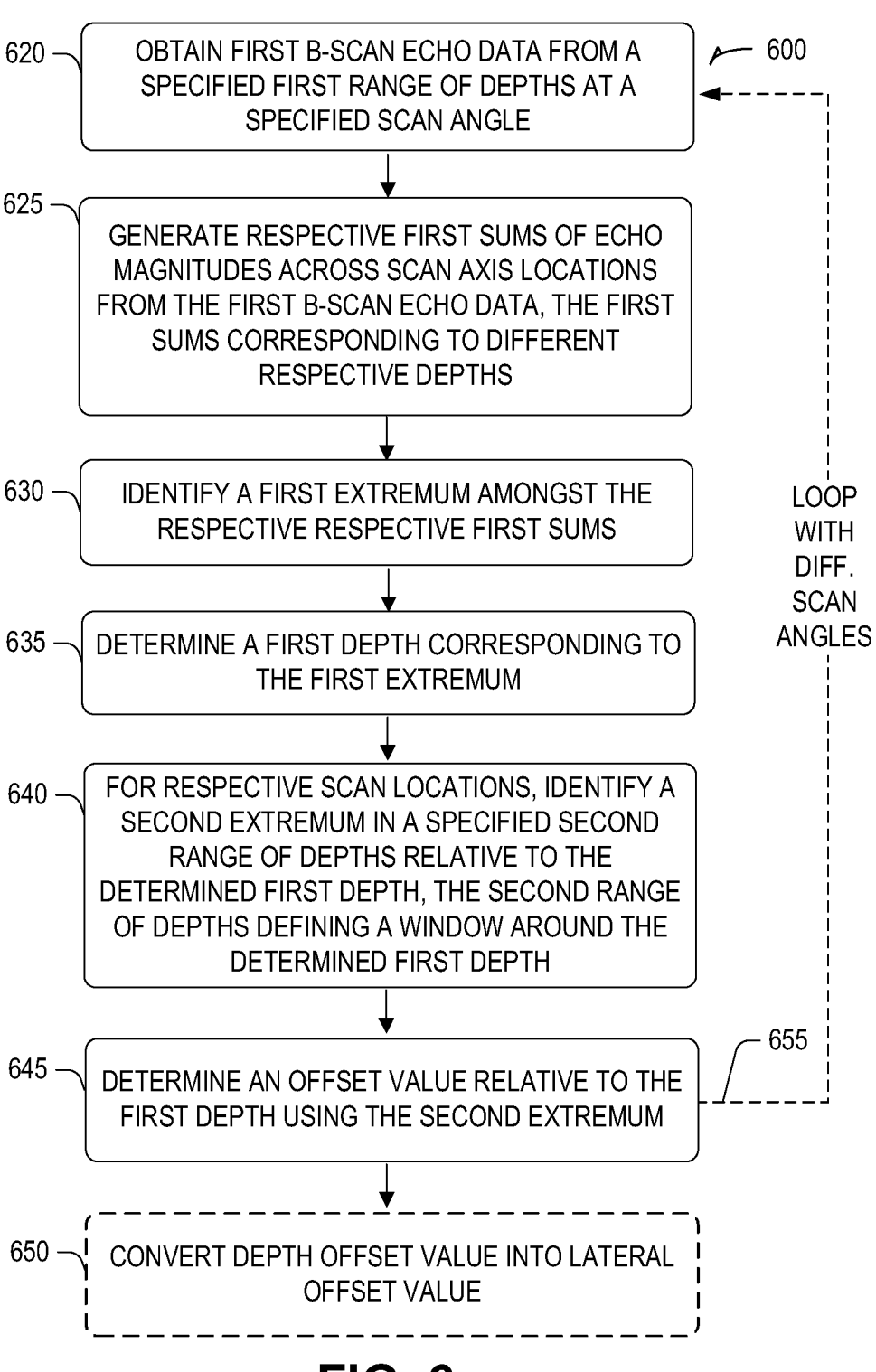

620 — OBTAIN FIRST B-SCAN ECHO DATA FROM A SPECIFIED FIRST RANGE OF DEPTHS AT A SPECIFIED SCAN ANGLE

— 600

625 — GENERATE RESPECTIVE FIRST SUMS OF ECHO MAGNITUDES ACROSS SCAN AXIS LOCATIONS FROM THE FIRST B-SCAN ECHO DATA, THE FIRST SUMS CORRESPONDING TO DIFFERENT RESPECTIVE DEPTHS

630 — IDENTIFY A FIRST EXTREMUM AMONGST THE RESPECTIVE RESPECTIVE FIRST SUMS

635 — DETERMINE A FIRST DEPTH CORRESPONDING TO THE FIRST EXTREMUM

640 — FOR RESPECTIVE SCAN LOCATIONS, IDENTIFY A SECOND EXTREMUM IN A SPECIFIED SECOND RANGE OF DEPTHS RELATIVE TO THE DETERMINED FIRST DEPTH, THE SECOND RANGE OF DEPTHS DEFINING A WINDOW AROUND THE DETERMINED FIRST DEPTH

645 — DETERMINE AN OFFSET VALUE RELATIVE TO THE FIRST DEPTH USING THE SECOND EXTREMUM

— 655

650 — CONVERT DEPTH OFFSET VALUE INTO LATERAL OFFSET VALUE

LOOP WITH DIFF. SCAN ANGLES

FIG. 6

DRIFT TRACKING FOR ACOUSTIC SCAN

CLAIM OF PRIORITY

This patent application is a U.S. National Stage filing under 35 U.S.C. 371 from International Application No. PCT/CA2021/051669, entitled "DRIFT TRACKING FOR ACOUSTIC SCAN," filed on Nov. 24, 2021, which claims the benefit of priority of Badeau, U.S. Provisional Patent Application Ser. No. 63/119,376, entitled "DRIFT TRACKING FOR ACOUSTIC SCAN," filed on Nov. 30, 2020, which are hereby incorporated by reference herein in their entireties.

FIELD OF THE DISCLOSURE

This document pertains generally, but not by way of limitation, to non-destructive evaluation, and more particularly, to apparatus and techniques for ultrasonic inspection using a B-scan imaging mode.

BACKGROUND

Various inspection techniques can be used to image or otherwise analyze structures without damaging such structures. For example, one or more of x-ray inspection, eddy current inspection, or acoustic (e.g., ultrasonic) inspection can be used to obtain data for imaging of features on or within a test specimen. For example, acoustic imaging can be performed using an array of ultrasound transducer elements, such as to image a region of interest within a test specimen. Different imaging modes can be used to present received acoustic signals that have been scattered or reflected by structures on or within the test specimen.

For example, an amplitude or "A-scan" representation can include generating a plot or other display of a received ultrasound signal magnitude versus time or depth, such as along a linear beam axis or ray traversing the test specimen. Beamforming can be performed using coherent excitation of ultrasound transducers to provide a desired beam angle and focal location. For example, coherent excitation can include applying specified delay values (or phase shift) to pulses for transmission by individual array elements (or apertures defined thereby) to establish one or more desired beam angle and focal location. Alternatively, or in addition, beamforming can be performed in reception such as by summing received acoustic echo signals in manner where signals received from individual array elements are delayed (or phase shifted) to provide one or more of a desired beam angle and focal location.

A sectorial or "S-scan" representation can include a two-dimensional map (e.g., one or more of a brightness map or color map for example) representing received ultrasound signal magnitudes at respective scan angles corresponding to different beam directions extending radially outward from an origin. A respective scan angle within the S-scan can be associated with a corresponding A-scan representation along the line defined by the corresponding scan angle. As an illustrative but non-limiting example, such scanning can include generation of shear waves in respective beams spanning an angular range of 40 degrees to 70 degrees down-angle relative to a plane on which the transducer is located. Such an approach can be used for "angle-beam" inspection of weld structures, as an illustrative example.

In yet another imaging mode, a "B-scan" representation can be formed, such as by forming a two-dimensional map (again, including one or more of brightness or color to represent received signal magnitude, as illustrative examples). The B-scan can be established using received A-scan echo data corresponding to a respective scan angle within the S-scan, where A-scan representations are aggregated for different locations along a scan axis. The scan axis can be defined, for example, as a path parallel to a structure being inspected, such as a weld, with the sectorial scan representing a sector extending laterally outward from the scan axis. The B-scan imaging mode represents the projected amplitude along the depth axis of received A-scan echo data corresponding to a respective scan angle, along the scan axis, effectively yielding a depth-scan plane representation of the selected scan angle.

SUMMARY OF THE DISCLOSURE

Various focusing or beam-forming techniques can be performed to aid in construction of an image representing a region of interest on or within the test specimen. Such a region can include a weld structure, for example. Use of an array of ultrasound transducer elements can include use of a phased-array beamforming approach and can be referred to as Phased Array Ultrasound Testing (PAUT). For example, a delay-and-sum beamforming technique can be used such as including coherently exciting respective transducer elements or apertures for beamforming in transmission, or coherently summing time-domain representations of received acoustic signals from respective transducer elements or apertures for beamforming in reception, or both, as mentioned above. Also, as mentioned above, one or more of S-scan and B-scan imaging techniques can be used, such as to facilitate inspection of welded structures (e.g., welds joining sections of plating or pipe).

Various flaws can be detected using ultrasound-based acoustic inspection. In one approach, defects such as cracks, voids, porosities, or a lack of fusion can be identified using a PAUT approach. The PAUT approach can provide beams that are swept through various angles transverse to weld axis. Such an approach can be used to provide an S-scan representation, and a selected scan angle within the S-scan representation can be used to provide a B-scan image of the selected angle along the scan axis. Motion of the transducer along the scan axis can be measured using electro-optical or electro-mechanical approaches, as illustrative examples.

The present inventor has recognized, among other things, that a user viewing an S-scan or B-scan representation of a weld structure may use distinct image features corresponding to weld features as visual references (e.g. markers or fiducials distinct from flaws). Such image features can include echoes associated with the weld geometry itself, which are referred to as geometric echoes. If a probe assembly fails to maintain a controlled (e.g., constant) lateral position relative to a weld being inspected as the probe assembly is translated along a scan axis, a nearby flaw could be missed or mistaken for an earlier-observed geometric echo. For example, in some applications, the received ultrasound echo is gated (e.g. in depth or in propagation time) to retain only information corresponding to the weld region.

A difference in probe assembly lateral position relative to the initial position, such as a difference in position relative to an initial lateral distance between the probe assembly and the weld centerline may result in echo data failing to provide the intended spatial inspection coverage of the weld structure because the scan region, or the received echo data is now gated in an unwanted manner, potentially missing flaws. As another example, a user may observe a feature such as at or near a depth or a lateral position from a weld centerline on a display where previous geometric echo indications have been observed, but the probe assembly may have drifted to a different position laterally relative to the weld. In this example, the user may erroneously consider the later-observed feature to be a geometric echo associated with same weld feature (e.g., a corner of a cap or a root) as was observed previously, missing a potential flaw.

To address such technical challenges at least in part, the present inventor has developed a machine-implemented technique to assist in tracking the lateral displacement of the probe assembly relative to a region of interest such as an edge or centerline of a weld. Such a technique can be referred to generally as "index offset tracking." Such a technique can, for example, be used to gate the received ultrasonic data or to update the weld overlay or other indicia such as ruler position, such as for updating a presentation to a user of an S-scan or other image representation.

In an example, a technique, such as a machine-implemented method can be used aid ultrasonic inspection. The technique can include obtaining first B-scan echo data from a specified first range of depths at a specified scan angle, the first range of depths encompassing at least a portion of a structure being inspected, generating respective first sums of echo magnitudes across scan axis locations from the first B-scan echo data, the first sums corresponding to different respective depths, identifying an extremum amongst the respective first sums, determining an index value corresponding to the first extremum, for respective scan axis locations, identify a second extremum in a specified second range of depths relative to the determined first depth, the second range of depths defining a window around the determined first depth, determining an offset value relative to the index value using the identified second extremum, and, for example, updating a presentation for display to a user indicative of the determined offset value.

In an example, the technique optionally includes determining a plurality of offset values corresponding to different scan axis locations. In an example, the technique optionally includes determining a plurality of offset values corresponding to different specified scan angles. In an example, updating the presentation for display comprises generating a weld overlay template location using the determined offset value.

This summary is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 4A illustrates generally a technique such as can be used to perform a summation of rows of acoustic echo magnitudes shown in a B-scan representation, the sums performed across locations along a scan axis, with such resulting sums plotted for determination of a depth location where an extremum, such as a maximum value, occurs.

FIG. 4B illustrates generally how a depth gate (or corresponding propagation time gate) can be established in proximity to a detected extremum in the resulting sums determined at FIG. 4A, such as can be used to provide lateral position offset tracking

FIG. 6 illustrates generally a technique, such as a method, that can include determining a drift or offset value of a lateral position of a transducer probe.

DETAILED DESCRIPTION

Figure 7:
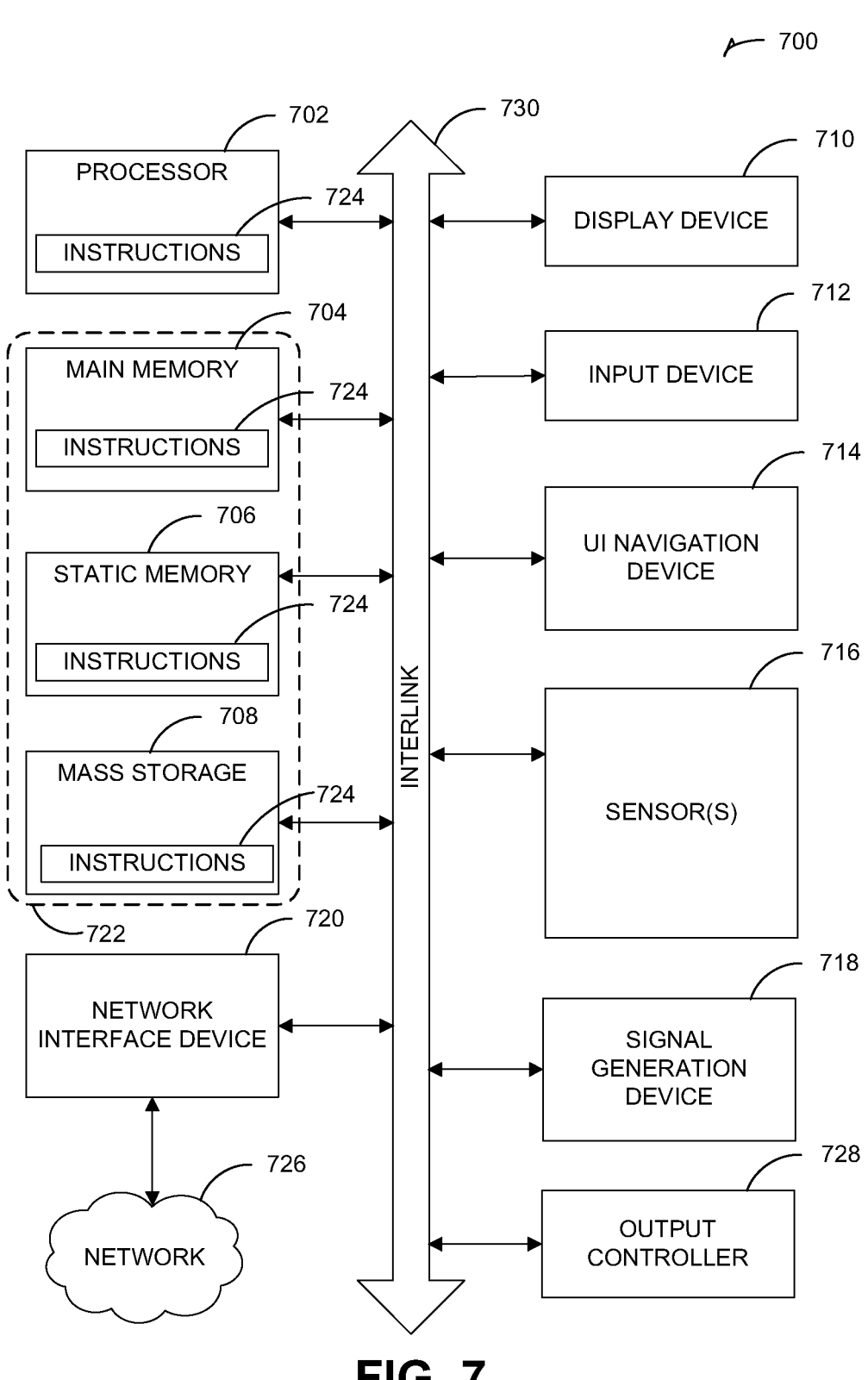
FIG. 7 illustrates a block diagram of an example comprising a machine upon which any one or more of the techniques (e.g., methodologies) discussed herein may be performed.

The present subject matter concerns apparatus and techniques that can be used to provide determination of drift in an acoustic probe assembly lateral position relative to a region of interest, such as a weld. In particular, the present subject matter can be used for one or more of tracking, storing, or presenting offset data, such as relative to an initial or nominal lateral location relative to the region of interest. A determined offset drift can be plotted or overlaid on scan imaging data, such as to help a user differentiate between benign image features such as geometric echoes versus features indicative of a defect or flaw. As an illustration, a template corresponding to a weld structure can be repositioned or imaging representation of scan data can be otherwise updated to display or compensate for drift in a lateral position of an acoustic probe assembly relative to a feature of interest such as a weld. Techniques as described in this document can be machine-implemented, such as performed using a portion or an entirety of an acoustic inspection system 100 as shown in FIG. 1, which can be communicatively coupled with or can include a machine 700 as shown in FIG. 7.

Figure 1:
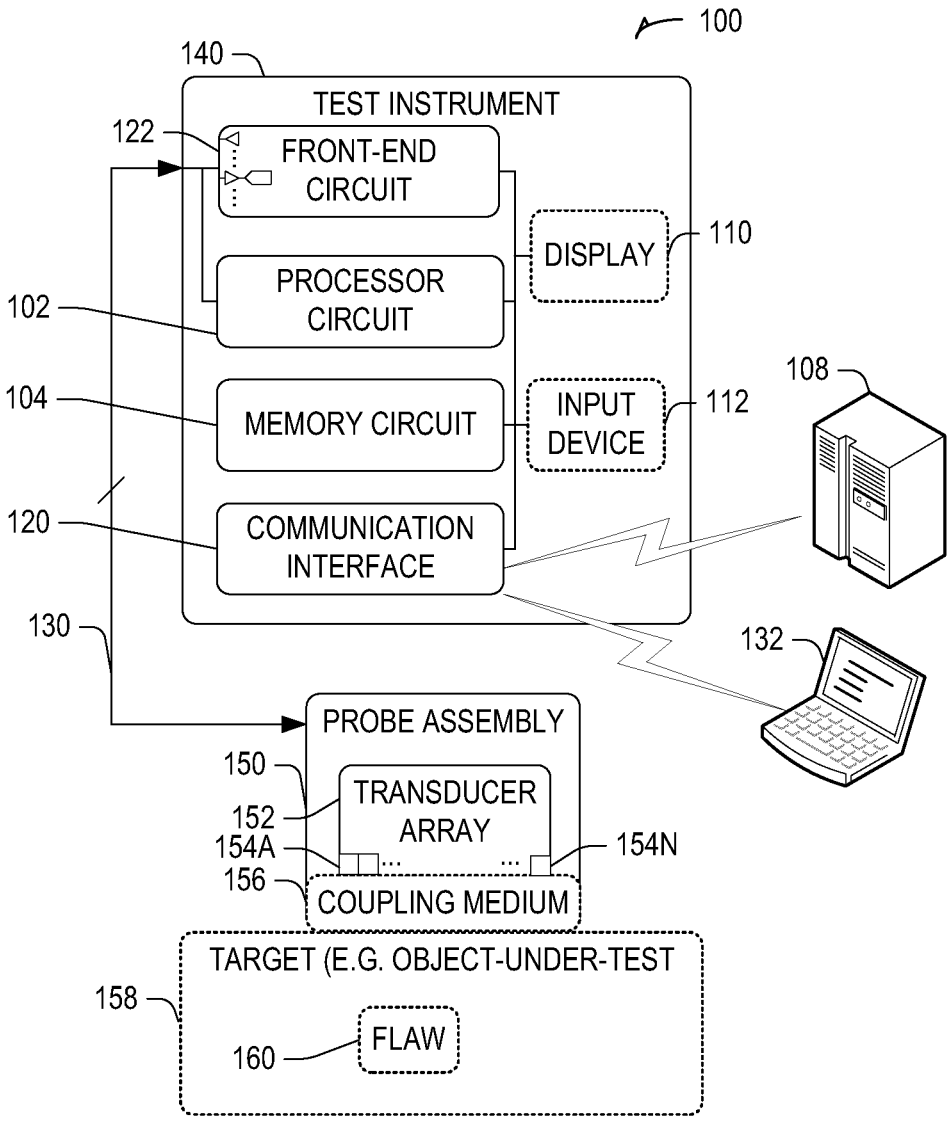
FIG. 1 illustrates generally an example comprising an acoustic inspection system, such as can be used to perform at least a portion one or more techniques as shown and described herein.

FIG. 1 illustrates generally an example comprising an acoustic inspection system 100, such as can be used to perform at least a portion one or more techniques as shown and described herein. The inspection system 100 can include a test instrument 140, such as a hand-held or portable assembly. The test instrument 140 can be electrically coupled to a probe assembly, such as using a multi-conductor interconnect 130. The probe assembly 150 can include one or more electroacoustic transducers, such as a transducer array 152 including respective transducers 154A through 154N. The transducers array can follow a linear or curved contour or can include an array of elements extending in two axes, such as providing a matrix of transducer elements. The elements need not be square in footprint or arranged along a straight-line axis. Element size and pitch can be varied according to the inspection application.

A modular probe assembly 150 configuration can be used, such as to allow a test instrument 140 to be used with various different probe assemblies 150. Generally, the transducer array 152 includes piezoelectric transducers, such as can be acoustically coupled to a target 158 (e.g., a test specimen or "object-under-test") through a coupling medium 156. The coupling medium can include a fluid or gel or a solid membrane (e.g., an elastomer or other polymer material), or a combination of fluid, gel, or solid structures. For example, an acoustic transducer assembly can include a transducer array coupled to a wedge structure comprising a rigid thermoset polymer having known acoustic propagation characteristics (for example, Rexolite® available from C-Lec Plastics Inc.), and water can be injected between the wedge and the structure under test as a coupling medium 156 during testing.

The test instrument 140 can include digital and analog circuitry, such as a front-end-circuit 122 including one or more transmit signal chains, receive signal chains, or switching circuitry (e.g., transmit/receive switching circuitry). The transmit signal chain can include amplifier and filter circuitry, such as to provide transmit pulses for delivery through an interconnect 130 to a probe assembly 150 for insonification of the target 158, such as to image or otherwise detect a flaw 160 on or within the target 158 structure by receiving scattered or reflected acoustic energy elicited in response to the insonification. While FIG. 1 shows a single probe assembly 150 and a single transducer array 152, other configurations can be used, such as multiple probe assemblies connected to a single test instrument 140, or multiple transducer arrays 152 used with a single or multiple probe assemblies 150 for tandem inspection. Similarly, a test protocol can be performed using coordination between multiple test instruments 140, such as in response to an overall test scheme established from a master test instrument 140, or established by another remote system such as a compute facility 108 or general purpose computing device such as a laptop 132, tablet, smart-phone, desktop computer, or the like. The test scheme may be established according to a published standard or regulatory requirement and may be performed upon initial fabrication or on a recurring basis for ongoing surveillance, as illustrative examples.

The receive signal chain of the front-end circuit 122 can include one or more filters or amplifier circuits, along with an analog-to-digital conversion facility, such as to digitize echo signals received using the probe assembly 150. Digitization can be performed coherently, such as to provide multiple channels of digitized data aligned or referenced to each other in time or phase. The front-end circuit can be coupled to and controlled by one or more processor circuits, such as a processor circuit 102 included as a portion of the test instrument 140. The processor circuit can be coupled to a memory circuit, such as to execute instructions that cause the test instrument 140 to perform one or more of acoustic transmission, acoustic acquisition, processing, or storage of data relating to an acoustic inspection, or to otherwise perform techniques as shown and described herein. The test instrument 140 can be communicatively coupled to other portions of the system 100, such as using a wired or wireless communication interface 120.

For example, performance of one or more techniques as shown and described herein can be accomplished on-board the test instrument 140 or using other processing or storage facilities such as using a compute facility 108 or a general-purpose computing device such as a laptop 132, tablet, smart-phone, desktop computer, or the like. For example, processing tasks that would be undesirably slow if performed on-board the test instrument 140 or beyond the capabilities of the test instrument 140 can be performed remotely (e.g., on a separate system), such as in response to a request from the test instrument 140. Similarly, storage of imaging data or intermediate data such as A-scan matrices of time-series data or compressed phase data, for example, can be accomplished using remote facilities communicatively coupled to the test instrument 140. The test instrument can include a display 110, such as for presentation of configuration information or results, and an input device 112 such as including one or more of a keyboard, trackball, function keys or soft keys, mouse-interface, touch-screen, stylus, or the like, for receiving operator commands, configuration information, or responses to queries.

Figures 2A, 2B:
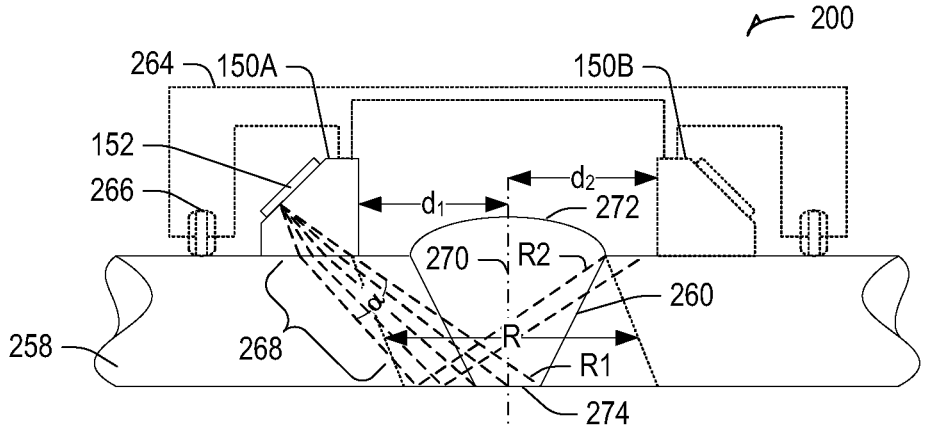
FIG. 2A illustrates generally an example comprising a side view (e.g., a section view) of an acoustic inspection configuration facilitating angle-beam inspection of a weld structure.
FIG. 2B illustrates generally an example comprising a plan view of the acoustic inspection configuration of FIG. 2A, showing a lateral position of a transducer probe assembly, and indicating an ideal scan path along a scan axis, and a varying scan path such as may occur as the probe is moved along the scan path during an inspection operation.

FIG. 2A (which is not drawn to scale) illustrates generally an example comprising a side view (e.g., a section view) of an acoustic inspection configuration 200 facilitating angle-beam inspection of a weld structure 260 using one or more probe assemblies (such as an acoustic inspection probe 150A), and FIG. 2B illustrates generally an example comprising a plan view of the acoustic inspection configuration 200 of FIG. 2A, showing an ideal scan path 282A along a scan axis, and a varying scan path 280A such as may occur as the probe 150A is moved along the scan path 282A during an inspection operation. Generally, the ideal scan path 282A would follow a weld feature such as an edge, scribe line, or indicium to remain at a fixed lateral distance (e.g., $d_1$ for a transducer probe 150A) relative to the weld structure 260 being inspected. The acoustic probe 150A of FIG. 2A and FIG. 2B can be included as a portion of a system 100 as shown in FIG. 1 or communicatively coupled to such as system 100.

Referring to FIG. 2A and FIG. 2B, acoustic probes such as the probe 150A and optionally, another probe 150B can be scanned along the scan path 280A (e.g., a scan axis as shown in FIG. 2B parallel to a long axis of the weld structure 260) either by hand manipulation or conveyed by a motorized or manually actuated scanner assembly 264. The scanner assembly 264 can include a frame or other support assembly and one or more wheels 266 to follow a contour of a pipe or plate or other object 258 being inspected, and can include a magnetic portion to affix the scanner assembly 264 to a surface of the object 258, if the object is ferromagnetic, for example.

Generally, acoustic inspection probe assemblies (e.g., probes 150A and 150B) can each include one or more acoustic transducers, such as an acoustic transducer array 152 configured to transmit or receive acoustic energy through a wedge structure to provide an angle-beam scan capability. For example, the transmit or receive beamforming can generate pulsed acoustic energy 268 to form of a beam spanning a specified range, a, of down-angles to provide sectorial or "S-scan" imaging. Acoustic energy 268 launched into the object 258 can have a propagation path including one or more internal reflections. Scattered or reflected acoustic energy can then be detected either using the first acoustic probe 150A or a second acoustic probe 150B. Using a phased-array-ultrasound beamforming technique, the beam of acoustic energy 268 can be scanned across different angles to acoustically probe a scan region, "R," encompassing a portion or entirety of the weld structure 260.

For example, selected beam angles within the range, α, of down-angles can be used to obtain echo information indicative of a corner of the weld cap 272, as shown by a ray, "R2," or a weld root 274 as shown by the ray, "R1." Generally, the probe 150A or scanner assembly 264 are oriented to provide a specified lateral offset, $d_1$, from a centerline 270 of the weld structure 260. This can be referred to as an initial offset or "index offset." As shown by the geometry of the rays representing the acoustic energy 268, the index offset, $d_1$, influences the scan range, "R," of acoustic coverage of the weld structure 260. Generally, the index offset $d_1$ will be established to establish the scan region R to encompass a desired portion of the weld, laterally, and particularly to provide coverage of key weld features. Gating of a received acoustic signals in the time-domain can also be performed such as to constrain the acoustic imaging to the scan range, "R," such as to suppress unwanted reflections from outside the region, "R," or to suppress detection of acoustic energy associated with unwanted acoustic propagation modes, for example.

As shown in FIG. 2A and FIG. 2B, symmetric coverage of the weld structure 260 can be provided, such as by using a second acoustic probe 150B located laterally opposite the first acoustic probe 150A. Generally, the techniques described in this document can be used to perform probe lateral position drift tracking (e.g., tracking of a divergence of the actual scan path 280A versus the "ideal" path 282A) for either a first acoustic probe 150A, a second acoustic probe 150B, or both. Most commonly, the first acoustic probe 150A will be used for both transmission and reception (e.g., where a second probe 150B is not used or not present). In another example, the second probe 150B is used for both transmission and reception (and the first probe 150A is not used). When the second probe 150B is used, a second index offset $d_2$ (which may or may not be the same value as the first index offset $d_1$) can be established to define a corresponding scan region of acoustic coverage associated with the second acoustic probe 150B (or associated with pitch/catch operation of the first and second acoustic probes 150A and 150B together where the second acoustic probe is operating in a transmitting mode rather than a receiving mode).

While the example of FIG. 2B illustrates generally a planar object 258 under inspection, the techniques herein are applicable to curved structures such as cylindrical structures, for example, including pipes, pylons, or other welded structures as illustrative examples. For example, the weld structure 260 can be a circumferential weld (e.g., a girth weld) between pipeline segments and the scan path 282A can define a circumferential path around the outer diameter (e.g., outer surface) of the pipe. In another example, the scan path 282A can define a circumferential path around an inner diameter (e.g., an inner surface) of a pipe. For example, a support pylon for a wind turbine or other large structure may be permit access to an inner diameter of a structure to permit an inspection location on an inner-facing portion of the structure.

Figures 3A, 3B:
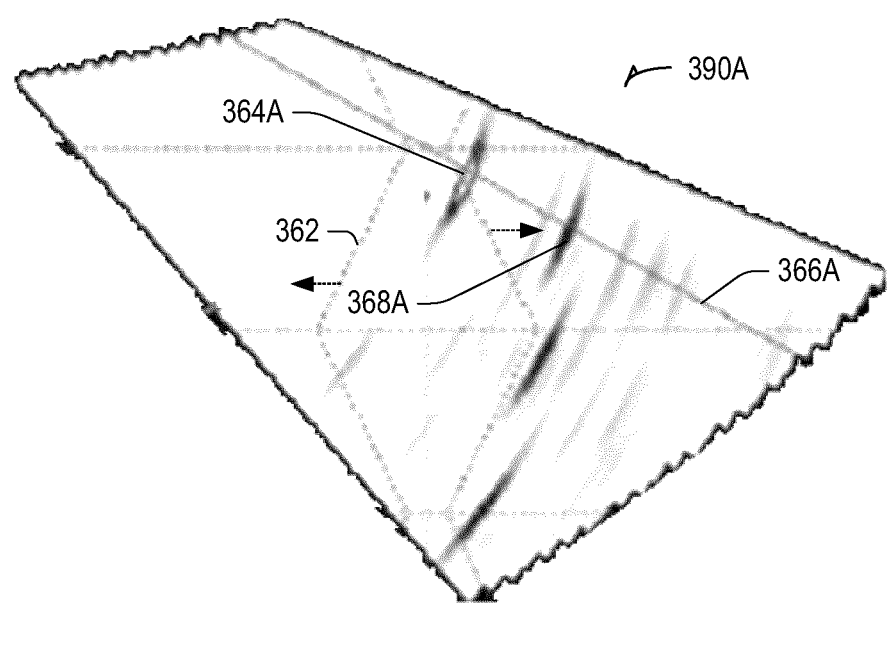
FIG. 3A shows an illustrative example of an S-scan representation obtained using angle beam inspection of a weld structure, the S-scan representation showing geometric echo features such as can be used to perform lateral position motion tracking as shown and described herein.
FIG. 3B shows an illustrative example of an B-scan representation obtained using angle beam inspection of a weld structure, the B-scan representation corresponding to a selected scan angle within the S-scan representation of FIG. 3A, where different locations along the horizontal axis of FIG. 3B correspond to different locations along a scan axis as described in FIG. 2B, where the vertical axis of the B-scan plot represents the projected depth of the selected scan angle data.

FIG. 3A shows an illustrative example of a sectorial scan or "S-scan" representation 390A obtained using angle beam inspection of a weld structure (such as using an inspection configuration 200 as shown in FIG. 2A and FIG. 2B), the S-scan representation 390A showing geometric echo features such as can be used to perform offset tracking as shown and described herein. In the example of FIG. 3A, a user can identify an image feature 364A such as corresponding to a geometric echo associated with a weld structure feature. A weld overlay or template 362 can be overlaid on the representation 390A to aid in identifying or otherwise identifying other features of the weld structure, or to assist in localizing a spatial location of a potential flaw relative to known weld structure feature locations. Generally, the drift tracking techniques described in this document can be used, for example, to reposition the weld overlay or template 362 in response to detected drift in a lateral location of the acoustic probe position. For example, the template 362 can be shifted laterally (e.g., left or right) depending on a detected lateral drift at a particular location along the scan axis, as indicated by the arrows in the horizontal direction. A line indicative of a selected scan angle 366A or other identifier can be used to select a beam angle for which a corresponding B-scan representation can be generated. Generally, the S-scan plane representation is parallel to the depth-index plane and orthogonal to a scan axis. In the illustrative example of the representation 390A of FIG. 3A, a geometric echo 364A and another echo 368A are crossed by the selected scan angle 366A.

FIG. 3B shows an illustrative example of an B-scan representation 366B obtained using angle beam inspection of a weld structure, the B-scan representation 366B corresponding to a selected scan angle 366A within the S-scan representation of FIG. 3A, where different locations along the horizontal axis of FIG. 3B correspond to different locations along a scan axis 382 as described in FIG. 2B, where the vertical axis of the B-scan plot 366B represents the projected depth of the selected scan angle data and where different locations along the vertical axis of FIG. 3B correspond to different locations along the thickness of the inspected part. For example, the echo 364A seen in FIG. 3A is represented in FIG. 3B at 364B. The line formed at 364B along the scan axis 382 represents the geometrical echo as seen by angle 366A along the scan axis 382. In FIG. 3B, as an ultrasound scan is performed along the scan axis 382, a geometric echo 364B forms a linear path across the B-scan representation 366B, along with other features such as the echo 368B. If the scan axis 382 traversed by the transducer probe (e.g., probe 150A or 150B as shown above) is maintained at a constant lateral distance with respect to the weld-under-test, the geometric echo 364B line and other features 368B can appear at a stable depth. Identifying and tracking a lateral position of an acoustic probe using the B-scan representation 366B can include identifying a depth (or corresponding delay value) corresponding to the geometric echo 364B and then tracking variation of the geometric echo 364B depth or delay value. Tracking of a geometric echo 364B is illustrative and another image feature generating a consistent echo at a specified depth or propagation time can be tracked to provide lateral position offset detection or compensation.

Figure 2C:
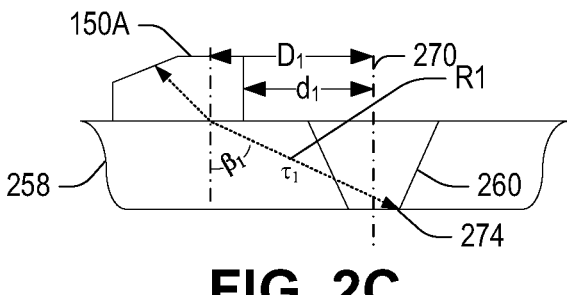
FIG. 2C and FIG. 2D illustrate generally examples comprising simplified side views showing how variation in probe lateral position (e.g., "$\Delta d$") can be determined trigonometrically from a propagation delay value and refracted angle of the scan within the structure under test.
Figure 2D:
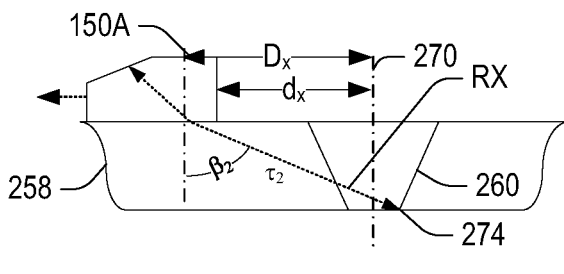

FIG. 2C and FIG. 2D illustrate generally examples comprising simplified side views showing how variation in lateral position (e.g., "Δd") can be determined trigonometrically from a propagation delay value and given a known refracted angle of the scan within the structure under test. Generally, as mentioned above, an S-scan spans a variety of scan angles within the object 258 under test, and a selected angle can be represented by $\beta_1$ for the beam established by the acoustic probe 150A (e.g., by an phase-array structure included as a portion of the probe 150A). The selected angle can be used to generate a B-scan representation. A vertical axis of the B-scan representation (e.g., 366B in FIG. 3B) corresponds to a depth within the object 258. A geometric echo associated with a corner root 274 (or other feature) of a weld structure 260 can provide a measured round-trip propagation delay "$\tau_1$" to the interface between the probe 150A and the object 258. If the selected scan angle, $\beta_1$, and the propagation velocity of an acoustic wave (e.g., a shear wave within the object 258) is known (e.g., represented as "c"), then a lateral distance, $D_1$, can be determined as ½ the propagation delay, $\tau_1$, multiplied by propagation velocity, c, and then multiplied by the sine of the selected beam angle, $\beta_1$, to provide a projection of the propagation path in the lateral axis (e.g., horizontally as shown in FIG. 2C). A distance from the probe 150A face, $d_1$, is slightly offset laterally from the lateral distance D1. Referring to FIG. 2D, which is similar to FIG. 2C, the probe 150A lateral location has shifted slightly (such as may occur as the probe is scanned in parallel to the weld 260 or other structure). The probe may now be at a new, unknown, lateral location, dx. In order to perform tracking of variation or "drift" in the lateral position, a difference, "Δd," can be determined because a difference between the index offset $d_1$ and new position $d_x$ is generally the same as the difference between a determined lateral location $D_1$ and a lateral location $D_x$ where the acoustic beam is incident on the acoustic probe 150A. In general, the following relations apply:

$$D_1 = [(\tau_1 c)/2] \cdot \sin(\beta_1). \qquad \text{EQN 1}$$

$$\Delta D = D_x - D_1 = \Delta d = dx - d1 = [c/2] \cdot (\tau_2 \cdot \sin(\beta_2) - \tau_1 \cdot \sin(\beta_1)]. \quad \text{EQN 2}$$

In FIG. 2D, a slightly different angle, $\beta_2$ is shown. In general, for small variations in probe lateral location (e.g., a few millimeters of variation), $\beta_2 \cong \beta_1$ because a geometric echo associated with the weld root will still be detectable at the same selected scan angle even if the beam is not perfectly aligned to scan the corner of the weld. Generally, in this document, a propagation delay value can be related to a depth value (such as shown in a B-scan representation in the vertical axis), and a lateral distance (e.g., $D_1$, $D_x$) can be determined trigonometrically as discussed above.

The B-scan representation 366B of FIG. 3B and FIG. 4A can represent a "raw" uncompensated B-scan for which lateral probe position drift tracking will be performed. In an illustrative example, FIG. 4A illustrates generally a technique that can be used to perform a summation of rows 484-1 through 484-M of acoustic echo magnitudes shown in the B-scan representation 366B, the sums performed across locations 482-1 through 482-N along a scan axis, with such resulting sums plotted for determination of a depth location where an extremum 364C, such as a maximum value, occurs. In this manner, a representation 398 can be established corresponding to "M" different depth (or delay) row pixel amplitudes (or other values indicative of echo magnitude) summed across "N" scan axis locations.

Generally, the M locations in the vertical axis correspond to M samples in an A-scan, with N A-scans being summed sample-wise for the representation 398 (e.g., a first sample in each of the N A-scans is summed to provide a first value in the representation 398). The representation 398 can be referred to as a "merged A-scan" representation, where its vertical axis represents the summed amplitude and its horizontal axis the depth (or time delay) axis, equivalent to the vertical axis of the B-scan 390B. The extremum 364C corresponds to a depth 396 defining a central tendency (e.g., an average or median depth) of the geometric echo 364B depth. The depth 396 can then be treated as a nominal depth or delay value corresponding to the geometric echo 364B, about which future drift of the echo 364B location can be tracked or compensation can be applied. Generally, the depth 396 is an index depth value along the selected beam axis in the sectorial scan.

FIG. 4B illustrates generally how a window or "depth gate" (or corresponding propagation time gate) can be established in proximity to a detected extremum 364C in the resulting sums of the merged A-scan representation 398 shown at FIG. 4A, such as can be used to provide lateral probe position tracking within a specified window relative to a reference lateral position (e.g., an initial lateral position or average lateral position of the probe, for example). In the merged A-scan representation 398 as shown in FIG. 4B, a tracking window or gate can be established, such as defined by limits 388A and 388B specified relative to the index depth 396 corresponding to the earlier-identified extremum 364C. During further scanning or B-scan analysis, the window defined by limits 388A and 388B can be used as a search window, as shown illustratively in the example FIG. 5A. In an illustrative example, a user can select either a width of the window (e.g., relative to the center of the window or in total), or limit 388A and 388B values, or otherwise define a depth range for the search window for use in further tracking or compensation. In another example, the window (defined by limit 388A and 388B values) can be established automatically, such as using an indicium of dispersion of the merged A-scan 398 values. For example, a standard deviation or variance value could be used to establish the window (and corresponding limit 388A and 388B values relative to the index depth 396), such as without requiring user input.

Figures 5A, 5B:
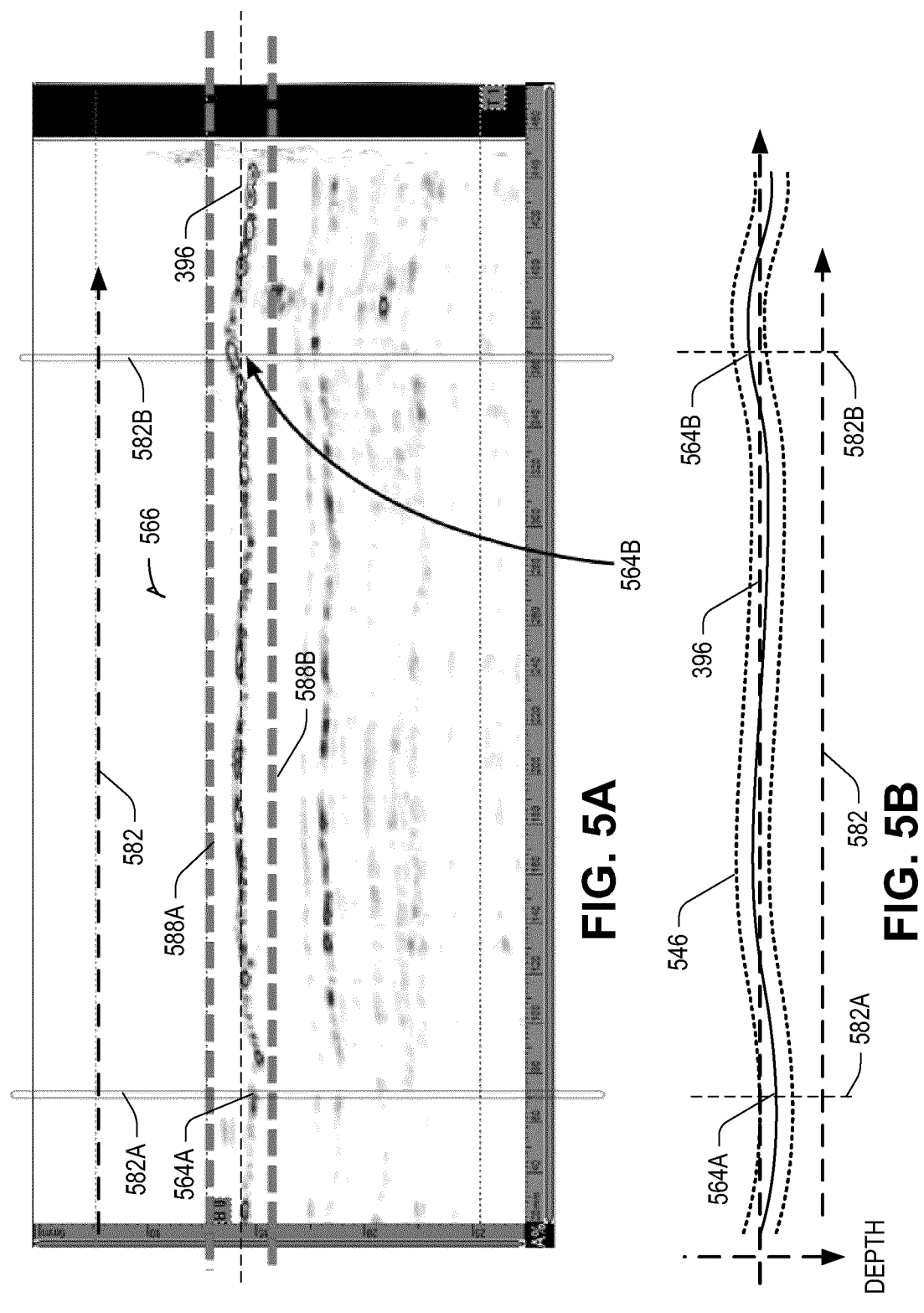
FIG. 5A illustrates generally how a depth gate (or corresponding propagation time gate) can be used to provide lateral position offset tracking relative to a determined depth corresponding to an initial lateral position of an acoustic transducer probe.
FIG. 5B illustrates generally an example of a representation of the consequence of drift in probe lateral location on the representation of a geometric echo from a weld structure.

The phrase "tracking" refers to generating a graphical or numerical representation of a drift in the lateral location of the acoustic probe relative to the tracked feature as the probe is scanned along the scan axis. Such a graphical representation can include providing an overlay over B-scan imaging, or a numerical value representative of an offset (either in terms of delay value or offset distance along the lateral axis in millimeters or other units, for example), or both. As an illustration, FIG. 5A illustrates generally how a depth gate (or corresponding propagation time gate), such as defined by limits 588A and 588B, can be used to provide probe lateral position tracking within a specified window relative to a depth 396 corresponding to an initial or average probe lateral position. FIG. 5B illustrates generally an example of a representation of an offset or "drift" relative to an index depth, such as corresponding to a geometric echo from a weld structure, and such as can be plotted or stored in view of analysis of the B-scan representation 566 of FIG. 5A.

In FIG. 5A, a B-scan representation 566 shows how a location of geometric echo varies along a scan axis 582. As an illustrative example, the plot of FIG. 5B can represent an offset value relative to the index depth 396 (e.g., so that offset values are represented as positive or negative offset values relative to a zero-valued index set at depth 396). A plot such as shown in FIG. 5B can be generated during or after performance of a B-scan acquisition. For example, the plot shown in FIG. 5B can also provide weld overlay 546, showing likely boundaries of interest relating to a weld structure under inspection. In another example, the difference in depth values associated with variation in the probe lateral position can be used to determine a $\Delta d$ value, as discussed above in relation to FIG. 2C and FIG. 2D. The resulting $\Delta d$ value can be used to update a location of a weld overlay or other template in an S-scan view, either in addition to a B-scan view or instead of providing a view as shown in FIG. 5B. In FIG. 5B, the probe lateral position offset values can be determined as values along a lateral axis between an ultrasound probe and a feature of interest such as a weld edge or centerline. Such a determination can be performed trigonometrically based on the scan angle or using a fixed scaling value to adjust an offset value originally determined in the depth dimension or starting from a delay value determined along the depth dimension, as illustrative examples, and as discussed above generally in relation to FIG. 2C and FIG. 2D

Referring to both FIG. 5A and FIG. 5B, a first location 582A along the scan axis 582 shows a geometric echo location 564A that is deeper than the index depth 396, and a corresponding plot in FIG. 5B shows the tracked location as being deeper from the index depth 396 in the representation of FIG. 5B. Similarly, at a second location 582B along the scan axis 582, the corresponding geometric echo location 564B is shown as shallower than the index depth 396, and the tracked location in FIG. 5B shows the tracked location as being shallower than the index depth 396. The offset values at each location along the scan axis 582 could be used to modify the image of FIG. 5A, such as to shift respective columns of pixels up or down in the image 566 of FIG. 5A to align the geometric echoes linearly along the index depth 396, and such modification of B-scan imaging can be referred to as offset compensation. In another example, a weld overlay 546 or other template can be provided as shown in FIG. 5B or overlaid on the B-scan imaging of FIG. 5A to provide an indication to a user concerning index drift and relative shift of the weld structure in the image. As mentioned above, data indicative of the depth offset can be converted to a lateral offset and used to update a location of a weld overlay or other template in an S-scan view, either in addition to a B-scan view or instead of providing a view as shown in FIG. 5B.

FIG. 6 illustrates generally a technique 600, such as a method, that can include determining a drift or offset value of a lateral position of a transducer probe. For example, at 620, first B-scan echo data can be obtained from a specified first range of depths at a specified scan angle (e.g., a specified sectorial or "S-scan" beam angle). At 625, respective first sums of echo magnitudes can be generated across scan axis locations from the first B-scan echo data. Each of the sums can correspond to a row of values at a respective depth. At 630, a first extremum can be identified amongst the values of the first sums. For example, 635, a depth location corresponding to a sum having a maximum value amongst the first sums can be determined. At 640, for respective scan locations, a second extremum can be identified, such as from a second range of depths relative to the determined first depth. The second range of depths can span a specified window of depths to form a search window as discussed elsewhere herein. Such a window can be established around a reference of "index" depth corresponding to the depth identified at 635. At 645, an offset value can be determined relative to the first depth using the second extremum. The offset value can be determined as a depth offset value or, optionally at 650, a lateral offset value can be determined. For example, delay values or depth values along the specified scan angle can be converted to a lateral offset distance between an ultrasonic probe assembly and a feature of the structure being inspected, such as an offset distance along the surface of the structure being inspected as shown in FIG. 2A and FIG. 2B (e.g., an offset relative to distance $d_1$ or distance $d_2$, for example), and as can be derived as shown in FIG. 2C and FIG. 2D. Optionally, at 655, a series of offset values can be determined corresponding to different scan angles, such as averaged or otherwise aggregated to improve an estimate in the lateral offset. For example, a new B-scan can be performed at each scan angle to determine a new index depth, and a series of offset values relative to each respective index depth at each scan angle can be determined and aggregated, such as averaged FIG. 7 illustrates a block diagram of an example comprising a machine 700 upon which any one or more of the techniques (e.g., methodologies) discussed herein may be performed. In various examples, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet device, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (Saas), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware comprising the circuitry may include variably connected physical components (e.g., execution units, transistors, simple circuits, etc.) including a computer readable medium physically modified (e.g., magnetically, electrically, such as via a change in physical state or transformation of another physical characteristic, etc.) to encode instructions of the specific operation. In connecting the physical components, the underlying electrical properties of a hardware constituent may be changed, for example, from an insulating characteristic to a conductive characteristic or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 730. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 716 may include a machine-readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 may constitute machine-readable media.

While the machine-readable medium 722 is illustrated as a single medium, the term "machine-readable medium" may include a single medium or multiple media (e.g., a centralized or distributed database, and/or associated caches and servers) configured to store the one or more instructions 724.

The term "machine-readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine-readable medium examples may include solid-state memories, and optical and magnetic media. Accordingly, machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices: magnetic or other phase-change or state-change memory circuits: magnetic disks, such as internal hard disks and removable disks: magneto-optical disks; and CD-ROM and DVD-ROM disks.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks such as conforming to one or more standards such as a 4G standard or Long Term Evolution (LTE)), Plain Old Telephone (POTS) networks, and wireless data networks (e.g., Institute of Electrical and Electronics Engineers (IEEE) 802.11 family of standards known as Wi-Fi®, IEEE 802.15.4 family of standards, peer-to-peer (P2P) networks, among others). In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software.

VARIOUS NOTES

Each of the non-limiting aspects in this document can stand on its own or can be combined in various permutations or combinations with one or more of the other aspects or other subject matter described in this document.

The above detailed description includes references to the accompanying drawings, which form a part of the detailed description. The drawings show, by way of illustration, specific embodiments in which the invention can be practiced. These embodiments are also referred to generally as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc., are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Such instructions can be read and executed by one or more processors to enable performance of operations comprising a method, for example. The instructions are in any suitable form, such as but not limited to source code, compiled code, interpreted code, executable code, static code, dynamic code, and the like. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A machine-implemented method to aid ultrasonic inspection, the method comprising:
   obtaining first B-scan echo data from a specified first range of depths at a specified scan angle, the first range of depths encompassing at least a portion of a structure being inspected;
   generating respective first sums of echo magnitudes across scan axis locations from the first B-scan echo data, the first sums corresponding to different respective depths;
   identifying an extremum amongst the respective first sums;
   determining an index value corresponding to a first depth indicated by the first extremum;
   for respective scan axis locations, identifying a second extremum in a specified second range of depths relative to the determined first depth, the second range of depths defining a window around the determined first depth;
   determining an offset value relative to the index value using the identified second extremum; and
   updating a presentation for display to a user indicative of the determined offset value.

2. The machine-implemented method of claim 1, comprising determining a plurality of offset values corresponding to different scan axis locations.

3. The machine-implemented method of claim 1, comprising determining a plurality of offset values corresponding to different specified scan angles.

4. The machine-implemented method of claim 3, comprising determining a central tendency of the determined offset values corresponding to different specified scan angles.

5. The machine-implemented method of claim 1, wherein the structure being inspected comprises a weld.

6. The machine-implemented method of claim 5, wherein the updating the presentation for display comprises generating a weld overlay template location using the determined offset value.

7. The machine-implemented method of claim 6, wherein the presentation for display comprises an S-scan representation.

8. The machine-implemented method of claim 1, wherein the offset value is converted to a lateral offset distance between an ultrasound probe and a feature of the structure being inspected.

9. The machine-implemented method of claim 8, wherein the feature comprises an edge of a weld root, an edge of a weld cap, or a center-line of a weld structure.

10. The machine-implemented method of claim 1, wherein an ultrasound probe is oriented to insonify the specified first range of depths using the specified scan angle.

11. The machine-implemented method of claim 1, wherein an acoustic inspection probe is at least one of driven or monitored in a manner to form a beam at the specified scan angle.

12. The machine-implemented method of claim 1, wherein the specified scan angle is a down-angle extending obliquely into the structure being inspected.

13. The machine-implemented method of claim 1, comprising receiving a selection of the specified scan angle from a user.

14. The machine-implemented method of claim 1, wherein the specified scan angle is shown as an indicium on the presentation comprising a sectorial scan ("S-scan") display.

15. The machine-implemented method of claim 1, wherein generating the respective first sums comprises summing pixel values in a first B-scan image across the scan axis locations in the first B-scan image; and
   wherein identifying an extremum amongst the respective first sums comprises determining a respective sum amongst the first sums having a maximum magnitude.

16. The machine-implemented method of claim 1, comprising, using the presentation, generating a graphical representation of series of offset values corresponding to different scan axis locations.

17. The machine-implemented method of claim 16, wherein the graphical representation of the series of offset values is displayed relative to an index offset value.

18. The machine-implemented method of claim 16, wherein the graphical representation includes a representation of a feature of the structure being inspected.

19. The machine-implemented method of claim 18, wherein the representation of the feature comprises an overlay indicative of boundaries of a weld structure.

20. The machine-implemented method of claim 16, wherein the series of offset values are adjusted to provide offset values that represent a lateral distance between an ultrasound probe and a feature of the structure being inspected.

21. The machine-implemented method of claim 1, wherein the first and second extrema are maxima.

22. A system, comprising:

an acoustic inspection probe;

a front-end circuit coupled to the acoustic inspection probe;

a display;

a processor circuit coupled to the front-end circuit and the display; and a memory circuit coupled to the processor circuit, the memory circuit comprising instructions that, when executed by the processor circuit, cause the system to:

obtain first B-scan echo data from a specified first range of depths at a specified scan angle, the first range of depths encompassing at least a portion of a structure being inspected;

generate respective first sums of echo magnitudes across scan axis locations from the first B-scan echo data, the first sums corresponding to different respective depths;

identify an extremum amongst the respective first sums;

determine an index value corresponding to a first depth indicated by the first extremum;

for respective scan axis locations, identify a second extremum in a specified second range of depths relative to the determined first depth, the second range of depths defining a window around the determined first depth;

determine an offset value relative to the index value using the identified second extremum; and update a presentation for display to a user indicative of the determined offset value.

*    *    *    *    *